United States Patent [19]
Nilssen

[11] Patent Number: 4,855,860
[45] Date of Patent: * Aug. 8, 1989

[54] GROUND-FAULT PROTECTED BALLAST

[76] Inventor: Ole K. Nilssen, Caesar Dr., Rte. 5, Barrington, Ill. 60010

[*] Notice: The portion of the term of this patent subsequent to Jan. 7, 2003 has been disclaimed.

[21] Appl. No.: 730,596

[22] Filed: May 6, 1985

Related U.S. Application Data

[63] Continuation-in-part of Ser. No. 640,240, Aug. 13, 1984, Pat. No. 4,563,719, which is a continuation of Ser. No. 412,771, Aug. 30, 1982, abandoned.

[51] Int. Cl.⁴ .............................................. H02H 3/33
[52] U.S. Cl. ........................................ 361/45; 361/42; 315/307
[58] Field of Search ............................ 361/42, 44–50; 315/307, 222, 226, DIG. 2, DIG. 4, DIG. 5, DIG. 7; 331/113 A

[56] References Cited

U.S. PATENT DOCUMENTS

| | | | |
|---|---|---|---|
| 3,633,070 | 1/1972 | Yassos et al. | 361/46 |
| 3,662,216 | 5/1972 | Hildebrant | 315/307 X |
| 4,005,335 | 1/1977 | Perper | 331/113 A X |
| 4,053,813 | 10/1977 | Kornrumpf et al. | 315/DIG. 2 X |
| 4,115,829 | 9/1978 | Howell | 361/42 |
| 4,240,009 | 12/1980 | Paul | 331/113 A X |
| 4,258,403 | 3/1981 | Shimp | 361/44 X |
| 4,553,070 | 11/1985 | Sairanen et al. | 331/113 A X |
| 4,563,719 | 1/1986 | Nilssen | 361/45 |

Primary Examiner—A. D. Pellinen
Assistant Examiner—Anthony Wysocki

[57] ABSTRACT

An inverter-type ballast has built-in differential current transformer operative to sense any substantive difference in the currents flowing from each of its two output terminals. If a substantive difference exists for more than just a brief period, a trigger circuit operates to disable the inverter, thereby to remove voltage from the output terminals.

16 Claims, 1 Drawing Sheet

GROUND-FAULT PROTECTED BALLAST

Instant application is a continuation-in-part of application Ser. No. 06/640,240 filed on 08/13/84 now U.S. Pat. No. 4,563,719, which was a continuation of application Ser. No. 06/412,771 filed on 08/30/82, now abandoned.

BACKGROUND OF THE INVENTION

1. Field of the Invention

The present invention relates to ballasts for fluorescent lamps, particularly of a type having built-in means for preventing ground-fault currents from the ballast output.

2. General Background and Rationale

With most fluorescent lighting fixtures, the voltages required at the sockets to start the fluorescent lamps are so high as potentially to constitute a substantial electric shock hazard to persons having to service such fixtures. To mitigate this hazard, whenever socket voltages exceed certain levels, protective measures have to be provided.

The essential shock hazard problem associated with a fluorescent lighting fixture relates to the situation where a person, who may be in contact with earth ground, is holding onto one end of a fluorescent lamp while the other end of the lamp is inserted into its socket.

Consequently, by using lamp sockets of a type that provides for disconnection of the socket voltage whenever a lamp is removed, acceptably safe operation will result. Alternatively, electrical isolation can be provided between ground and the ballast output to the lamp sockets.

In most applications of inverter-type ballasts, the resulting socket voltages are high enough to require protective measures; and the only presently available commercially practicable solution is that of using an isolation transformer to provide electrical isolation between the power line input (ground) and the ballast output to the lamp sockets. While this solution is indeed safety-wise acceptable, it involves substantial penalties in terms of ballast cost, size and weight, as well as in overall ballast efficiency.

Of course, circuit-interrupting sockets could be used; but that solution would require non-standard and substantially more costly lamp sockets in addition to extensive added wiring within the fixture. Thus, for electronic ballasts the use of circuit-interrupting lamp sockets would constitute an even less attractive solution than that of using an isolation transformer.

Based on the background outlined above, subject invention relates to a very cost-effective electronic means of providing a function substantially equivalent to that provided by circuit-interrupting lamp sockets.

SUMMARY OF THE INVENTION

1. Objects of the Invention

A first object of the present invention is that of providing a fluorescent lamp ballast with means for automatically shutting off its output voltage in case there is a significant component of output current flowing directly from ballast output to ground.

A second object is that of providing an inverter-type ballast wherein the ballast output voltage is switched off in case there is a significant flow directly to ground of current from the ballast output.

These as well as other objects, features and advantages of the present invention will become apparent from the following description and claims.

BRIEF DESCRIPTION

Subject invention relates to a fluorescent lamp ballast that comprises means by which the ballast output voltage is shut off in cases where a significant component of output current is flowing from one of the ballast output terminals and directly to ground.

According to the preferred embodiment of the invention, a ballast of the type described above contains the following key elements:

(a) A source of DC voltage;

(b) A self-oscillating inverter connected with said source of DC voltage and operative to provide a substantially squarewave AC output voltage of a frequency in the range of 20 to 40 kHz;

(c) A resonant inductor-capacitor series-combination connected directly across the output of this inverter;

(d) Means for connecting a fluorescent lamp in parallel with the capacitor of said inductor-capacitor series-combination; and (e) Means for sensing an unbalanced flow of ballast output current and for stopping inverter oscillation in case of excessive unbalance.

The method used for turning off the self-oscillating inverter is that of using a transistor means operative to block the feedback in the inverter feedback loop. This transistor means is actuated by the output from a differential transformer, the balanced primary windings of which are fed with the currents flowing in-to and out-of the ballast output terminals. In case of an unbalance in these two currents, a net output will result from the differential transformer and the transistor means will be actuated.

In other words, if a current flows out of one of the ballasts's output terminal, but not simultaneously into the other output terminal, a ground-fault condition must exist; and the inverter oscillation is terminated.

The inverter is of a type that needs to be triggered into oscillation. Upon initial power-up, triggering occurs almost immediately. However, arrangements are provided by which re-triggering after a shut-off will occur only after an adjustable and relatively long time period.

DESCRIPTION OF THE PREFERRED EMBODIMENT

Details of Construction

Figure 1:
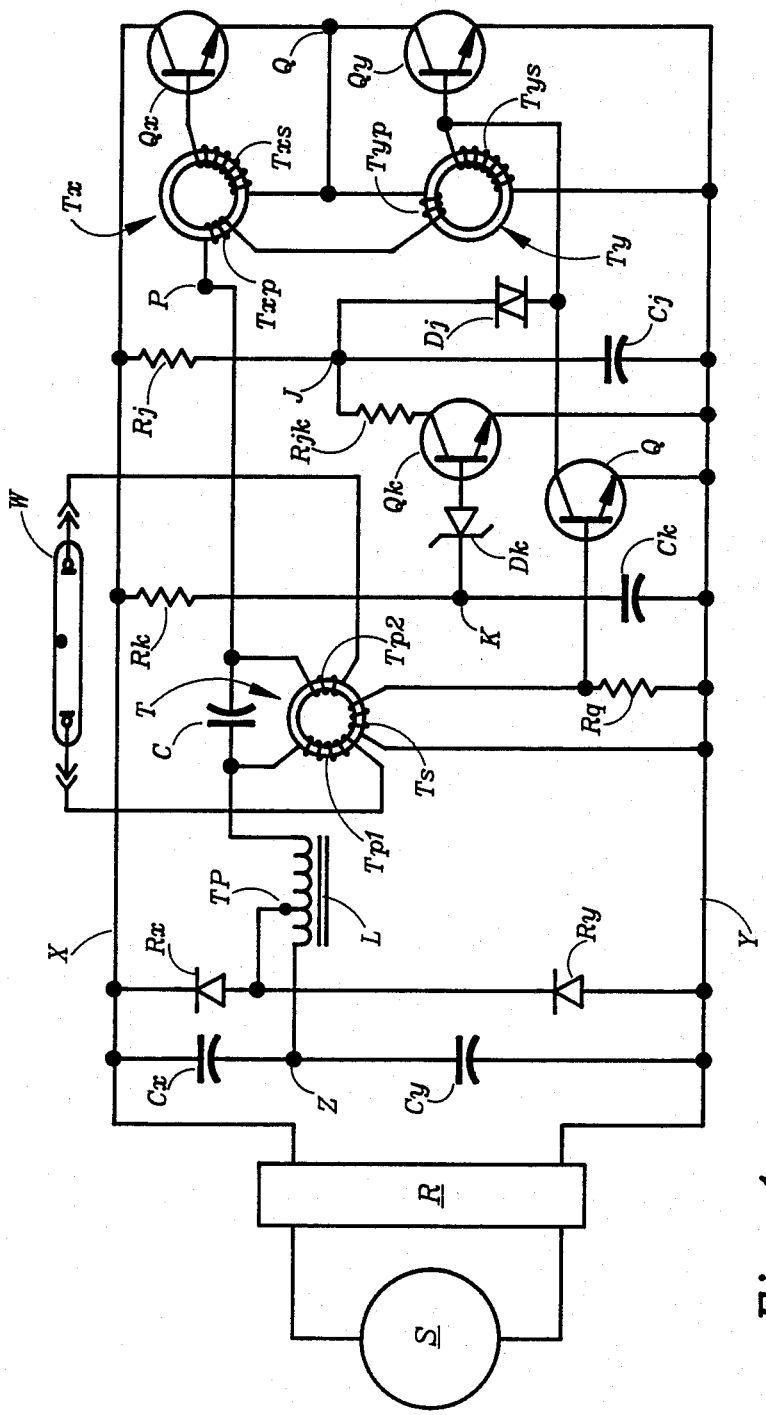
FIG. 1 schematically illustrates the preferred embodiment of the invention, showing an inverter-type ballast adapted to operate an instant-start fluorescent lamp.

In FIG. 1, a source S of 120 Volt/60 Hz voltage is applied to a rectifier means R, the rectified output of which is applied to inverter bus bars X and Y, respectively—with bus bar X carrying the B+ voltage. An energy-storing filter capacitor Cx is connected between bus bar X and a junction Z; another energy-storing filter capacitor Cy is connected between junction Z and bus bar Y.

A switching transistor Qx is connected with its collector to bus bar X and with its emitter to a junction Q; another switching transistor Qy is connected with its collector to junction Q and with its emitter to bus bar Y.

A saturable feedback transformer Tx has a primary winding Txp and a secondary winding Txs; a saturable feedback transformer Ty has a primary winding Typ and a secondary winding Tys.

Primary windings Txp and Typ are connected in series with one another and between junction Q and another junction P.

Secondary winding Txs is connected between the base and the emitter of transistor Qx; secondary winding Tys is connected between the base and the emitter of transistor Qy.

A high-quality high-frequency capacitor C and a high-quality high-frequency inductor L are connected in series with one another and between junction Z and junction P.

Inductor L has a tap-point TP, which is connected to the anode of a high-frequency rectifier Rx and to the cathode of a similar rectifier Ry. The cathode of rectifier Rx and the anode of rectifier Ry are connected to bus bars X and Y, respectively.

A load W, which is an instant-start fluorescent lamp, is disconnectably connected across capacitor C by way of the primary windings Tp1 and Tp2 of a differential current transformer T.

A resistor Rj is connected between bus bar X and a junction J; a capacitor Cj is connected between junction J and bus bar Y; and a Diac Dj is connected between junction j and the base of transistor Qy.

Another resistor Rk is connected between bus bar X and a junction K; a capacitor Ck is connected between junction K and bus bar Y; and a Zener diode Dk is connected between junction K and the base of a transistor Qk, which Zener diode has its cathode connected to junction K. Transistor Qk has its emitter connected to bus bar Y and its collector connected to junction j through a resistor Rjk.

A secondary winding Ts of transformer T is connected between bus bar Y and the base of a transistor Q, whose emitter and collector are connected to bus bar Y and the base of transistor Qy, respectively. A resistor means Rq is connected between the base and the emitter of transistor Q.

Details of Operation

The operation of the circuit of FIG. 1 may be explained as follows.

The two transistors Qx and Qy are operated as a self-oscillating half-bridge inverter: (a) with timed positive current feedback being provided by saturable feedback transformers Tx and Ty; (b) with B+ power being provided from a center-tapped DC power supply, which power supply consists of AC power source S, rectifier means R and series-connected filter capacitors Cx and Cy, which capacitors are of substantially equal capacitance and connected together at junction Z to form a power supply center-tap; and (c) with circuit oscillation being initiated by way of the trigger sub-circuit consisting of resistor Rj, which charges capacitor cj from B+, and which capacitor is periodically discharged into the base terminal of transistor Qy by way of Diac Dj.

The time it takes for the circuit to be triggered into oscillation is determined by the time it takes to provide the first trigger pulse to the base of transistor Qy; and the time it takes for this to occur is directly dependent upon the time it takes to charge capacitor Cj to a voltage high enough to cause voltage break-over of the Diac Dj.

For a given Diac and for given values of Rj and Cj, the time it takes for capacitor Cj to reach this break-over voltage substantially depends on the magnitude of the effective resistance present between junction J and bus bar Y. In fact, with the magnitude of that resistance being sufficiently small, the voltage on capacitor Cj will never reach a level high enough to cause Diac break-over.

If transistor Qk receives an adequate amount of base current, the resistance between junction J and bus bar Y depends essentially only on the magnitude of resistor Rjk; which magnitude is chosen such that the time required for charging capacitor Cj to a voltage of adequate magnitude for causing Diac break-over is relatively long compared with the time required if transistor Qk were not provided with an adequate amount of base current.

After initial circuit power-up, the time required before transistor Qk receives any significant amount of base current depends on the length of time it takes for capacitor Ck to charge up to a voltage high enough to permit significant current to flow through Zener diode Dk. This length of time is chosen to be substantially longer than the length of time it takes for Rj to charge Cj to the point of Diac breakover in the absence of the shunting effect caused by Rjk and transistor Qk.

Thus, immediately after power-up, capacitor Cj will be charged through Rj without being affected by the shunting effect caused by Rjk and transistor Qk; and the circuit will receive triggering pulses at a relatively rapid rate (typically several trigger pulses per second). However, about one second after power-up, capacitor Ck is charged to the point of causing base current to flow to transistor Qk; which means that the triggering rate has now been reduced substantially—to about one pulse per 30 seconds.

(By substituting a short-circuit for resistor Rjk, the triggering action can be completely eliminated after the initial power-up sequence; and the inverter circuit would have to be totally shut down before it could be re-triggered into operation. This arrangement is safety-wise desirable in some situations.)

In the preferred embodiment, the parameters of Rk, Ck and Dk are chosen such that it takes about one second after power-up for base current to start flowing to Qk; while Rj, Cj and Dj are chosen such that it takes only about 0.2 second to provide the first trigger pulse to the base of transistor Qy and thereby to initiate inverter circuit oscillation.

Consequently, circuit power-up will not be affected by the action of the trigger-delay sub-circuit (which is the sub-circuit consisting of Rk, Ck, Dk, Qk and Rjk). However, if somehow the oscillation has been interrupted by means other than that of complete circuit shut-down, circuit re-triggering will be delayed by an amount principally determined by the value of Rjk. In the preferred embodiment, this time delay is chosen to be about 30 seconds.

The output of the inverter is provided between junctions P and Z, and is a substantially squarewave voltage. This squarewave output voltage is applied across the L-C series-combination of inductor L and capacitor C.

The L-C series-combination is resonant at or near the fundamental frequency of the inverter squarewave voltage output. As a consequence, Q-multiplication takes place; and the voltage developed across inductor L and/or capacitor C becomes very large in magnitude in comparison with the magnitude of the fundamental frequency component of the squarewave voltage impressed across the L-C series-combination.

Inductor L is provided with a tap-point TP, which tap-point is connected to the DC power supply by way of a pair of high frequency rectifiers Rx and Ry. With rectifier polarities as shown, and if the voltage at the tap-point exceeds the voltage to which filter capacitors Cx or Cy are charged, current will flow from the tap-point to these capacitors. In effect, with capacitors Cx and Cy being of relatively large capacitance, rectifiers Rx and Ry will provide a clamp on the maximum voltage that can be developed at tap-point TP; which is nearly equivalent to that of providing a clamp on the voltage that can develop across inductor L and/or across capacitor C.

Thus, with the above-described voltage clamping means, the voltages that will develop across L and/or C can be limited to levels below those which would otherwise have been the case—the exact levels being determined mainly by the positioning on L of the tap-point. Consequently, even with no circuit loading present, the voltage developed across L and/or C can be limited in magnitude to a point well below the level where component destruction would be apt to take place or where circuit power dissipation would be excessive.

Loading of the inverter is accomplished by connecting an instant-start fluorescent lamp W across capacitor C of the series-resonant circuit by way of differential transformer T. (Connecting the load across the capacitor, as opposed to across the inductor, has the advantage that the voltage presented to the load will be nearly sinusoidal in waveshape—substantially free of all the harmonic components present of the original squarewave.)

The positioning of the tap point on L is determined by the voltage required for properly starting the instant-start fluorescent lamp W. Thus, before the lamp starts, current is flowing from the tap point, through rectifiers Rx and Ry, and to the power supply.

After the lamp has started, however, the voltage across it reduces to a much lower magnitude (typically to about one third of the voltage required for starting), and clamping current now ceases to flow.

In other words, the preferred embodiment of FIG. 1 will operate in a normal fashion as a high-frequency inverter-type fluorescent lamp ballasting means—as long as the current flowing through the one primary winding of differential current transformer T is equal to the current flowing back through the other primary winding of that transformer, which indeed will be the case under normal ballast operation.

However, if for some reason the current flowing through the one primary winding of T is different in amplitude and/or phase and/or waveshape from the current flowing through the other primary winding of T (something that will occur if a person were to provide contact between one of the lamp terminals and earth-ground [which, in turn, is connected with the power line input]), an output current will be provided at the secondary winding of T. (Of course, as long as the currents through the two primary windings are substantially identical in amplitude, waveshape and phase, no output will result from the secondary winding of T.)

If the magnitude of the output current from this secondary winding is large enough, transistor Q will be turned ON, and the result will be that of providing a near short-circuit across the base-emitter junction of transistor Qy; which short-circuit will have the effect of stopping the inverter circuit from oscillating.

Thus, if a ground-fault current occurs at either of the two connection means provided between the ballast circuit and the lamp, the inverter will immediately shut down, thereby stopping such ground-fault current from flowing.

The amount of ground-fault current required for causing inverter shut-down can readily be adjusted—either by adjusting the parameters of the differential transformer T or by adjusting the magnitude of resistor means Rq.

In fact, resistor means Rq is preferably a resistor means with a positive temperature coefficient, such as an incandescent lamp. With Rq having a positive temperature coefficient, the length of time it takes for a given ground-fault current to cause inverter shut-down depends on the magnitude of that current: for a ground-fault current of relatively small magnitude, the time required for shut-down will be relatively long; but for a ground-fault current of relatively large magnitude, the time required for shut-down will be relatively short.

In the preferred embodiment, the key characteristics associated with resistor means Rq (such as thermal inertia, temperature coefficient, and allowable operating temperature range) are chosen such that inverter shut-down will not occur due to the ground-fault current resulting during the brief period of normal lamp starting; which ground-fault current is due to the non-symmetry of the currents flowing from each of the two lamp cathodes and to the (normally grounded) lamp starting aid electrode. (Although, if it were to take an abnormally long time for the lamp to start—such as more than a couple of seconds—inverter shut-down might result from just the current flowing to said starting aid electrode.)

After the lamp has started, however, the magnitudes of the currents flowing to the starting aid electrode are substantially reduced as compared with the situation existing just before the lamp starts; and for the net amount of non-symmetrical current then flowing from the two lamp cathodes, inverter shut-down does not occur.

About 30 seconds after inverter shut-down (which, after initial power-up, is the approximate length of time it takes for circuit re-triggering to take place), inverter oscillation will be re-initiated; but only once more to be stopped if a sufficient magnitude of ground-fault current is still flowing.

It is believed that the present invention and its several attendant advantages and features will be understood from the preceding description. However, without departing from the spirit of the invention, changes may be made in its form and in the construction and interrelationships of its component parts, the form herein presented merely representing the preferred embodiment.

I claim:
1. A ballasting means comprising:
a voltage source operative to supply a current-limited AC voltage suitable for proper starting and operation of said lamp, said AC voltage being provided between a first and a second output terminal;
connection means having a first and a second input terminal, said connection means being operative to permit connection with a gas discharge lamp;
differential current transformer means connected between said output terminals and said input terminals, and operative to provide an output signal whenever the current flowing out of said first output terminal and into said first input terminal is substantively different from the current flowing into said second output terminal and out of said second input terminal; and safety means responsive to said output signal and operative, whenever said output signal has been provided for more than a relatively brief period of time, to cause substantial reduction in the magnitude of said AC voltage.

2. The ballasting means of claim 1 wherein said relatively brief period of time is on the order of one second or less.

3. The ballasting means of claim 1 and additional means operative, within a substantially pre-determined length of time after said reduction, to restore said AC voltage to the magnitude existing prior to said reduction.

4. The ballasting means of claim 3 wherein said substantially pre-determined length of time is on the order of 30 seconds.

5. The ballasting means of claim 1 wherein said source of AC voltage is connected in circuit with earth ground.

6. The ballasting means of claim 1 wherein said source of AC voltage comprises frequency converter means and where said AC voltage is of a fundamental frequency that is substantially higher than that of the voltages normally present on ordinary electric utility power lines.

7. The ballasting means of claim 6 wherein said source of AC voltage additionally comprises an L-C tuned circuit coupled in circuit with said converter means, said L-C tuned circuit being resonant at or near said fundamental frequency and operative to render said AC voltage substantially sinusoidal in waveshape.

8. A ballasting means capable of being powered from an ordinary electric utility power line and comprising:

rectification means connected in circuit with said power line and operative to supply a DC voltage;

inverter means operative to convert said DC voltage into a substantially squarewave voltage, said squarewave voltage having a fundamental frequency substantially higher than that of the voltage on said power line and being provided across a pair of squarewave output terminals;

an L-C series-circuit comprising an inductor and a capacitor effectively connected in series with one another, said L-C series-circuit being resonant at or near said fundamental frequency and connected across said pair of squarewave output terminals, a substantially sinusoidal AC voltage developing across said capacitor, the frequency of said AC voltage being equal to said fundamental frequency;

a first and a second output terminal connected with said AC voltage;

socket means operative to receive and make contact with a gas discharge lamp, said socket means having a first and a second input terminal;

differential current transformer means connected between said output terminals and said input terminals, and operative to provide an output signal whenever the current flowing out of said first output terminal and into said first input terminal is substantively different from the current flowing into said second output terminal and out of said second input terminal; and safety means responsive to said output signal and operative, whenever said output signal has been provided for more than a relatively brief period of time, to cause substantial reduction in the magnitude of said AC voltage.

9. The ballasting means of claim 8 wherein the inverter is operable to be triggered out of operation, and wherein said substantial reduction is attained by causing the inverter to be triggered out of operation in response to said output signal.

10. In a ballast having a first and a second output terminal for providing a current-limited AC voltage for starting and operating a gas discharge lamp with a current of frequency substantially higher than that of the voltage on an ordinary electric utility power line, said lamp having input terminals for receiving lamp operating current, the improvement comprising:

connect means operative to provide connection between said output terminals and said input terminals by way of a differential current transformer means, said transformer means being operative to provide an output signal in the event that there is a substantive difference in any current flowing from said first output terminal as compared with the current flowing from said second output terminal; and safety means responsive to said output signal and operative, whenever said output signal has been provided for more than a brief period of time, to cause substantial reduction in the magnitude of said AC voltage.

11. The improvement of claim 10 wherein said differential transformer is responsive to currents of any frequency equal to or larger than that of said AC voltage, but is substantially non-responsive to currents of any frequency approximately equal to or lower than that of the voltage on said power line.

12. The improvement of claim 10 wherein said brief period of time is on the order of one second or less.

13. The improvement of claim 10 and restoring means operative, some length of time after said reduction has occurred, to restore said AC voltage to its original magnitude.

14. The improvement of claim 13 wherein said length of time is on the order of 10 seconds.

15. A ballasting means for a gas discharge lamp, said ballasting means comprising:

a source of DC voltage;

an inverter operative to convert said DC voltage into a current-limited AC voltage, said AC voltage being provided across a pair of first terminals and having a magnitude that may be considered to represent an electric shock hazard to humans;

a pair of second terminals operative to permit connection with said lamp;

connect means operative to provide connection between said pair of first terminals and said pair of second terminals by way of a differential current transformer means, said transformer means being operative to provide an output signal in the event that there is a substantive difference in any current flowing out of one of said first terminals as compared with any current flowing into the other one of said first terminals; and safety means responsive to said output signal and operative, whenever said output signal has been provided for more than a brief period of time, to cause substantial reduction in the magnitude of said AC voltage, thereby to remove said electric shock hazard.

16. The ballasting means of claim 15 wherein said substantive difference is a current with a magnitude on the order of 50 mA RMS or less.

* * * * *